Oct. 17, 1967      E. L. R. WEBB      3,348,119
DC/DC TRANSFORMER WITH CURRENT FEEDBACK
Filed May 1, 1964
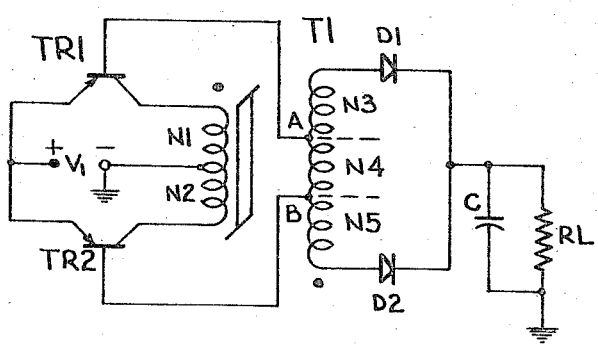
INVENTOR
EARLE L. R. WEBB
By *J. R. Hughes*
PATENT AGENT

United States Patent Office 3,348,119
Patented Oct. 17, 1967

3,348,119
DC/DC TRANSFORMER WITH CURRENT FEEDBACK
Earle Lester Robert Webb, Ottawa, Ontario, Canada, assignor to National Research Council, Ottawa, Ontario, Canada, a body corporate of Canada
Filed May 1, 1964, Ser. No. 364,162
1 Claim. (Cl. 321—2)

ABSTRACT OF THE DISCLOSURE

A transistorized DC/DC converter or transformer requiring only a single saturable core transformer and a pair of switching transistors wherein the switching signals for the transistors are taken from twin taps symmetrically located about the center of transformer secondary winding. The DC path through the load is completed alternately through the switching transistors constituting 100% series or current feedback.

This invention relates to a DC/DC converter.

Circuits using a square-wave oscillator comprising two switching transistors connected in push-pull relationship are well known for converting low voltage DC to a higher voltage, either AC or DC. A standard type of circuit of this kind has been the "voltage feedback" circuit, a form of which has been described in U.S. Patent No. 2,783,384, dated Feb. 26, 1957. This circuit, which has been quite successful and widely used, does suffer from the drawback that, when operating from a fixed voltage source of power, it must feed back internally sufficient drive power to provide for the maximum expected load. This results in excess feedback at any lesser load and is responsible for progressively poorer efficiency with decreasing loads. Modifications have been made to this type of circuit such that current feedback rather than voltage feedback is obtained. The standard form of circuit of this type has a square-wave oscillator made up of two switching transistors and the primary of a saturable core transformer with feedback for the switching transistors taken from the ends of the transformer secondary which also provides the step-up output voltage normally taken across a load resistor connected between a center tap of the secondary and ground. In this circuit the load current becomes the base drive current for the switching transistors and, although the aim of automatic feedback control is achieved, the output voltage that can usefully be obtained is limited to relatively low values, actually about half the safe voltage that may be applied to the base of the non-conducting transistor.

This latter circuit has been modified by adding a pair of rectifier diodes in the output, such that the two diodes together with the emitter-base diodes of the transistors form a bridge circuit supplied from the whole secondary winding. The possible output voltage of this circuit is double that of the previous circuit but still limited by the transistor rating.

It is an object of the present invention to provide a DC/DC converter circuit that will give a greatly increased voltage gain but which will operate with high efficiency at partial or light loads.

It is another object of the present invention to provide a converter circuit whose output voltage is not limited by the voltage ceiling that may be applied in the switching transistors.

These and other objects of the invention are achieved by the provision of a converter circuit comprised of a square-wave oscillator made up of two switching transistors connected in push-pull to the primary winding of a saturating core transformer, a full wave rectifier made up of the base emitter diodes of the said switching transistors and two rectifying diodes, and reversing bias feedback taken from symmetrically placed center taps on the transformer secondary to the bases of the transistors wherein the number of turns encompassed by said taps is small in comparison to the total number of turns on the said secondary. In this circuit the feedback function of the transformer secondary has been effectively separated from the feed-forward or output function.

In the drawing:

FIGURE 1 is a circuit diagram of the converter circuit according to the invention.

Referring to FIGURE 1, a DC/DC converter is made up of two switching transistors TR1 and TR2 whose emitters are connected together and whose collectors are connected to the two ends respectively of the primary winding $N1+N2$ of a transformer T1 which has a saturable magnetic core preferably of square loop material. A DC voltage $V_1$, which is to be amplified is applied between the common emitters of the transistors and the mid-point of the primary winding. The full secondary winding $(N3+N4+N5)$ of the transformer T1 is connected through rectifying diodes D1 and D2 to a common point. The output voltage of the circuit (hereunder designated as $V_2$) appears across the load, herein represented by the resistor RL and capacitor C in parallel, connected between the common point and ground. Feedback for the bases of the transistors is taken from twin taps A and B symmetrically located about the center of the transformer secondary winding and which encompass only a few turns N4 of the full secondary winding.

In operation, the input voltage $V_1$ is alternately applied to the two halves (N1 or N2) of the primary of the transformer by the switching action of the transistor. A square-wave AC voltage is induced in the full secondary winding. The switching action of the transistors is achieved by the reversing bias voltage obtained across winding N4. Diodes D1 and D2 and the emitter-base junctions of transistors TR1 and TR2 form a rectifier bridge supplied by the voltage on the secondary winding of the transformer. This results in a unidirectional current flowing in load resistor RL.

The necessary voltage obtained from winding N4 need only be sufficient to ensure transistor cut-off without overstress. The number of turns in N4 will be small compared to the total number on the full secondary winding. For many transistors two volts has been found adequate and for a given input voltage $V_1$, the number of turns N4 between the taps can be found from:

$$N4 = \frac{2N1}{V_1}$$

The additional turns N3 and N5 do not affect directly the transistor bias but provide for the desired output voltage. The approximate voltage ratio is given by:

$$V_2 = \frac{N3 + N4}{N1} V_1$$

It will be seen that because of this method of arranging the reversing bias, the limitation set by transistor base breakdown has been effectively removed. The remaining limitation on obtainable output voltage is set by collector-emitter breakdown voltage multiplied by the current gain $(h_{FE})$ of the transistor. Any attempt to use a voltage step-up ratio greater than the current gain of the transistors will result in insufficient current drive to the base of the "on" transistor. This restriction however is not too serious with modern high-gain transistors.

It has been found that near optimum performance of the circuit can be obtained over a wide range of step-up ratios smaller than the current gain $(h_{FE})$ of the transistors used. Voltage gains of 10 to 1 with efficient operation over a wide range of loads have been readily obtained and it might be expected that with care in the selection of transistor type and characteristics that this could be extended upwards to as high as 50 to 1.

What is claimed is:

A DC/DC converter comprising:
(a) a transformer having a saturable magnetic core,
(b) a first transistor having its collector connected to one end of the primary winding on said transformer,
(c) a second transistor, having its collector connected to the other end of the primary winding and its emitter connected to the emitter of the first transistor,
(d) input DC voltage connections between the common emitters and the mid-point on the said primary winding, said mid-point being grounded,
(e) connections from the ends of the secondary winding of the said transformer through diodes to a common point,
(f) load connections between the said common point and ground,
(g) feedback connections from the bases of said transistors to taps connected symmetrically about the untapped center of the secondary winding of the said transformer, said taps encompassing only a minor proportion of the total number of turns on the secondary winding.

References Cited

UNITED STATES PATENTS

| | | | |
|---|---|---|---|
| 2,928,036 | 3/1960 | Walker | 321—8 |
| 3,151,287 | 9/1964 | Pintell | 321—2 X |
| 3,219,907 | 11/1965 | Josephson | 321—18 |

JOHN F. COUCH, *Primary Examiner.*

W. H. BEHA, JR., *Assistant Examiner.*